United States Patent

Rodger et al.

(10) Patent No.: US 9,124,167 B2
(45) Date of Patent: Sep. 1, 2015

(54) ELECTRICAL MACHINE

(76) Inventors: David Rodger, Bath (GB); Hong Cheng Lai, Bath (GB)

( * ) Notice: Subject to any disclaimer, the term of this patent is extended or adjusted under 35 U.S.C. 154(b) by 392 days.

(21) Appl. No.: 13/062,127

(22) PCT Filed: Sep. 3, 2009

(86) PCT No.: PCT/GB2009/051121
§ 371 (c)(1),
(2), (4) Date: Mar. 28, 2011

(87) PCT Pub. No.: WO2010/026427
PCT Pub. Date: Mar. 11, 2010

(65) Prior Publication Data
US 2011/0260564 A1    Oct. 27, 2011

(30) Foreign Application Priority Data
Sep. 5, 2008   (GB) .................... 0816248.9

(51) Int. Cl.
*H02K 51/00* (2006.01)
*H02K 16/02* (2006.01)
*H02K 49/10* (2006.01)
*H02K 7/06* (2006.01)

(52) U.S. Cl.
CPC .......... *H02K 51/00* (2013.01); *H02K 7/06* (2013.01); *H02K 16/02* (2013.01); *H02K 49/102* (2013.01)

(58) Field of Classification Search
CPC ... H02K 1/2786; H02K 49/02; H02K 49/102; H02K 49/106; H02K 49/108; H02K 51/00; H02K 16/02
USPC ......................................................... 310/103
See application file for complete search history.

(56) References Cited

U.S. PATENT DOCUMENTS

| 2,161,374 | A | * | 6/1939 | Louis ........................... 417/353 |
| 2,371,511 | A |   | 2/1943 | Faus |
| 2,745,027 | A |   | 9/1952 | Williford, Jr. |
| 2,722,617 | A | * | 11/1955 | Meyer et al. .................. 310/103 |

(Continued)

FOREIGN PATENT DOCUMENTS

| CN | 1770607 A | 5/2006 |
| DE | 4223814 | 1/1994 |

(Continued)

OTHER PUBLICATIONS

Nakazawa et al., JP09056146 Machine Translation, Feb. 1997.*

*Primary Examiner* — Quyen Leung
*Assistant Examiner* — Eric Johnson
(74) *Attorney, Agent, or Firm* — Huffman Law Group, PC

(57) ABSTRACT

An electrical machine comprises: a first rotor, rotatable about a first axis, and having a first arrangement of magnets on a first surface thereof; a second rotor, held with a first surface thereof adjacent the first surface of the first rotor and such that it cannot rotate about the first axis, but is rotatable about a second axis, and having a second arrangement of magnets on the first surface thereof; wherein the first and second arrangements of magnets are such that rotation of the first rotor about the first axis causes rotation of the second rotor about the second axis. The first rotor is in the form of an at least partial hollow torus, with the first surface thereof being an internal surface. The second rotor is in the form of a cylinder, located within the hollow torus, with the first surface thereof being an external surface, such that the second axis is perpendicular to the first axis.

11 Claims, 18 Drawing Sheets

(56) References Cited

U.S. PATENT DOCUMENTS

| | | | |
|---|---|---|---|
| 3,671,756 A * | 6/1972 | Meier | 290/54 |
| 3,814,962 A | 6/1974 | Baermann | |
| 4,167,684 A * | 9/1979 | Kelly | 310/80 |
| 4,241,605 A | 12/1980 | Hendriks et al. | |
| 4,850,821 A * | 7/1989 | Sakai | 417/420 |
| 5,634,390 A | 6/1997 | Takeuchi et al. | |
| 6,288,463 B1 * | 9/2001 | Tada et al. | 310/75 B |
| 6,921,984 B2 * | 7/2005 | Rogg | 290/10 |
| 2004/0066107 A1 * | 4/2004 | Gery | 310/103 |
| 2004/0150279 A1 * | 8/2004 | Wise | 310/103 |
| 2006/0091748 A1 | 5/2006 | Yoda et al. | |
| 2007/0296298 A1 | 12/2007 | Jones et al. | |
| 2008/0197736 A1 * | 8/2008 | Himmelmann et al. | 310/156.08 |
| 2013/0278102 A1 * | 10/2013 | Levy | 310/114 |

FOREIGN PATENT DOCUMENTS

| | | | | |
|---|---|---|---|---|
| DE | 102009010056 | * | 9/2010 | H02K 49/10 |
| EP | 0713012 | | 5/1996 | |
| FR | 2580362 | | 4/1985 | |
| GB | 747727 | | 4/1956 | |
| GB | 1438869 | | 6/1976 | |
| GB | 2284105 | | 5/1995 | |
| GB | 2330239 | | 4/1999 | |
| JP | 57134066 A | * | 8/1982 | F16H 49/00 |
| JP | 02250657 A | * | 10/1990 | H02K 49/10 |
| JP | 09056146 A | | 2/1997 | |
| JP | 09056146 A | * | 2/1997 | H02K 49/10 |
| WO | WO2006105617 | | 10/2006 | |
| WO | WO2008148273 | | 12/2008 | |
| WO | WO2009062834 | | 5/2009 | |

* cited by examiner

ELECTRICAL MACHINE

RELATED APPLICATIONS

This application is a national stage application of International patent application no. PCT/GB09/051121 filed Sep. 3, 2009. This application also claims priority to Great Britain Patent Application No. 0816248.9, filed Sep. 5, 2008.

This invention relates to an electrical machine, and in particular to a machine that can be used to generate electrical current efficiently from a slowly moving body.

Electrical machines in the form of generators are very well known, in which a primary source of energy is used to rotate a body, and this rotor cooperates with a stator to produce an electric current. However, where the primary source of energy is one of the common sources of renewable energy, such as wind, tide, or wave, the rotor typically moves rather slowly, at least compared with the 3000 rpm achieved in a conventional power station.

The effect of this relatively slow movement is that the generator must be relatively large, which in turn means that the cost and mass of the generator is high. If conventional mechanical gearing is used to convert the slow rotation into a faster rotation of a rotor in a generator, then the gearing is a source of losses due to friction, and also reduces the reliability.

According to a first aspect of the present invention, there is provided an electrical machine, comprising:
a first rotor, rotatable about a first axis, and having a first arrangement of magnets on a first surface thereof;
a second rotor, held with a first surface thereof adjacent the first surface of the first rotor and such that it cannot rotate about the first axis, but is rotatable about a second axis, and having a second arrangement of magnets on the first surface thereof;
wherein the first and second arrangements of magnets are such that rotation of the first rotor about the first axis causes rotation of the second rotor about the second axis.

For a better understanding of the present invention, and to show how it can be put into effect, reference will now be made, by way of example, to the accompanying drawings, in which:—

Figure 1:
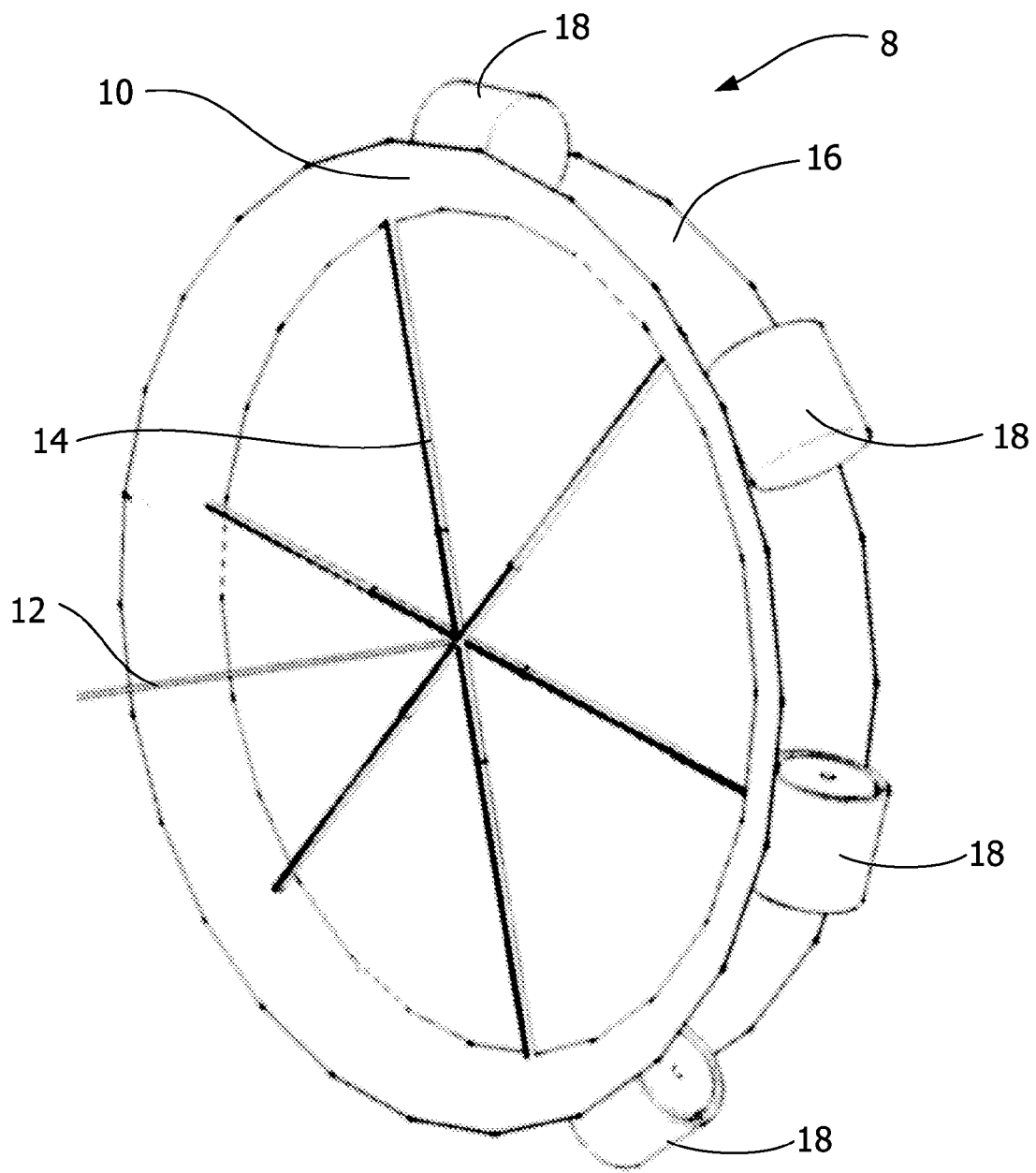
FIG. 1 is a schematic diagram, illustrating a part of a machine in accordance with the present invention.

FIG. 1 shows the general structure of an electrical machine 8 in accordance with the present invention. The electrical machine is described herein in the form of a generator, in which a rotation of a body is used to generate electrical power. However, it will be appreciated by the person skilled in the art that the same principle can be used to construct a motor, in which electrical power is applied, and used to cause a body to rotate.

The machine 8 of FIG. 1 has a first rotor 10, which is connected to an axle 12 by a support structure in the form of spokes 14. Rotation of the axle 12 then causes the rotor 10 to rotate about the axis defined by the axle. The rotation of the axle 12 can be driven by a power source such as a wind turbine, a tidal current machine, or a wave energy converter, and although it can of course be driven by any power source, the machine of the present invention is particularly suitable for situations where the driving rotation is at a relatively low speed, for example at about 20 rpm for the case of a typical 1.5 MW wind turbine. In addition, although FIG. 1 shows the rotor 10 being driven through the axle 12, it can be driven directly by a body that is being caused to rotate by the external power source. For example, it may be mounted directly onto the hub of a wind turbine.

The rotor 10 is generally toroidal. That is, it has an annular shape, which can be generated by rotating a circle about an axis that lies in the plane of the circle but outside the circle. This axis is then the axis about which the rotor is caused to rotate.

However, the surface of the rotor is not a complete torus. Specifically, the part of the circular cross-section that lies furthest away from the axis of rotation is omitted, leaving an annular gap 16.

Visible through the gap 16 in FIG. 1 is a cylindrical second rotor 18, which has an outer circular cross-section that is slightly smaller than the inner circular cross-section of the rotor 10.

Figure 2:
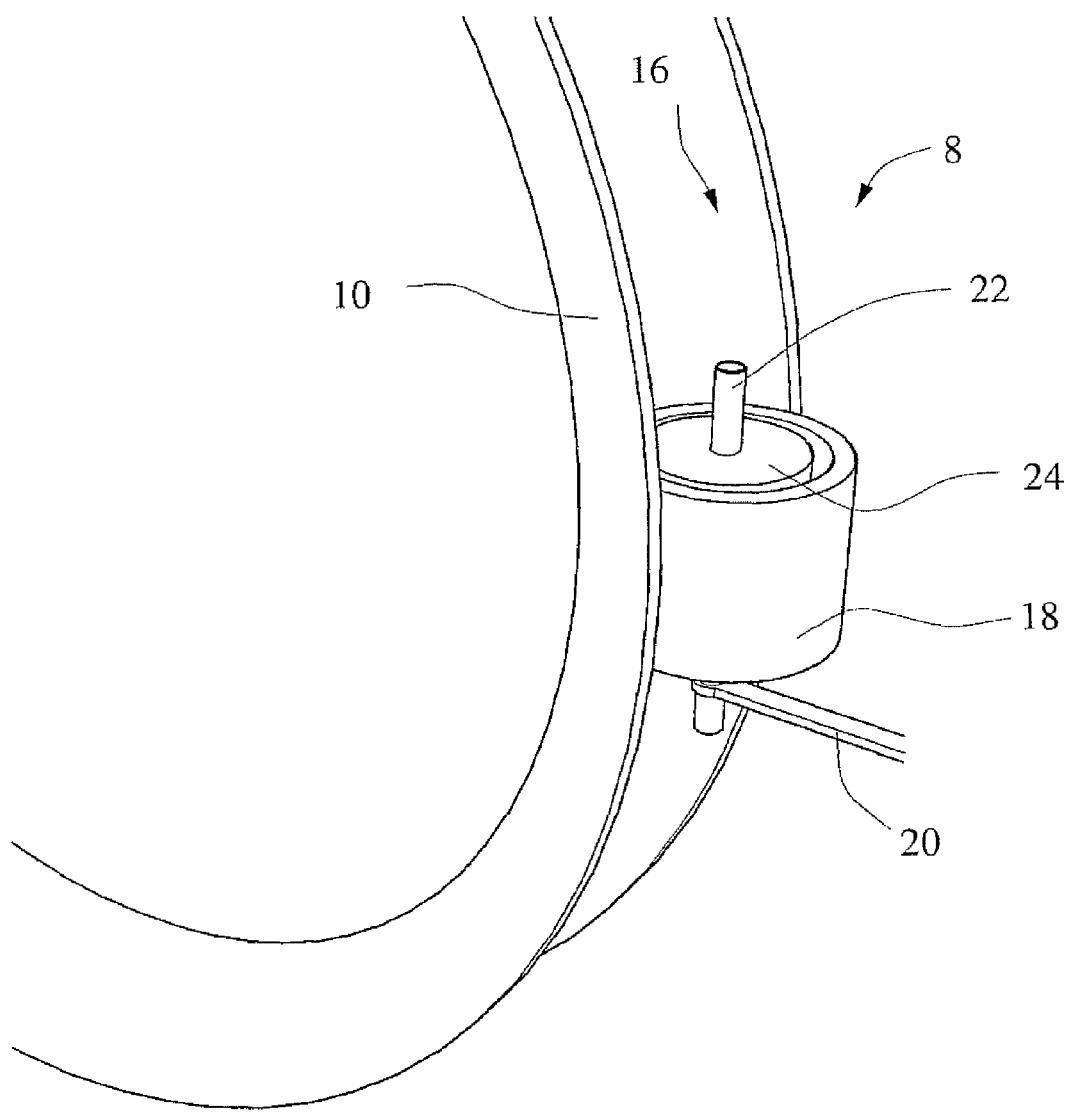
FIG. 2 shows a part of the machine of FIG. 1, to a larger scale.

FIG. 2 shows in more detail the part of the machine 8 in the region of the second rotor 18. Specifically, the second rotor 18 (and each of the other second rotors, not shown in FIG. 1 or 2) is mounted on a support structure 20, which makes it unable to move in the direction of rotation of the first rotor 10, but allows it to rotate about an axis 22 of its own circular cross-section.

Located within the second rotor 18 is a stator 24. As is well known, the second rotor 18 and the stator 24 can be designed such that rotation of the second rotor 18 about its axis 22 causes an electrical current to be generated in the stator 24, which can be supplied through output electrical circuitry (not shown) to electrical power supply lines, electrical power storage devices, etc.

Figure 3:
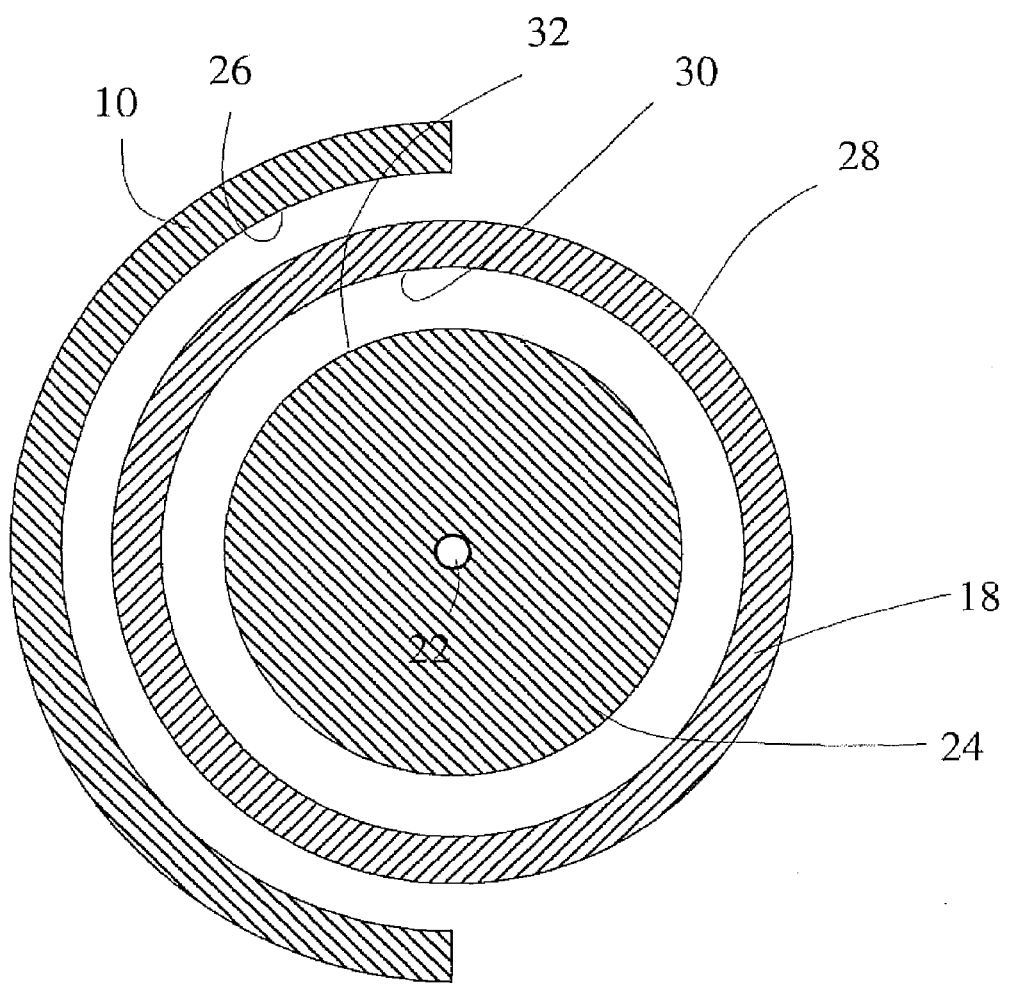
FIG. 3 is a cross-sectional view through the part shown in FIG. 2.

FIG. 3 is a cross-sectional view through the first rotor 10, second rotor 18, and stator 24.

As mentioned above, the first rotor 10 is rotatable about an axis that lies in the plane of this cross-section. Meanwhile, the second rotor 18 is prevented from rotating about the axis of rotation of the first rotor, but is able to rotate about the axis 22. Provided on a first, inner, surface 26 of the first rotor 10, and on a first, outer, surface 28 of the second rotor 18 are arrangements of magnets that have the effect that, as the first rotor 10 is caused to rotate about its axis of rotation, the second rotor 18 is forced to rotate about the axis 22. This will be described in more detail below.

In addition, provided on a second, inner, surface 30 of the second rotor 18 and on a first, outer, surface 32 of the stator 24 are the arrangements that are required such that rotation of the second rotor 18 about its axis 22 causes an electrical current to be generated in coils of wire mounted on the stator 24. Suitable forms of these arrangements will be well known to the person skilled in the art, and will not be described further herein.

Figure 4:
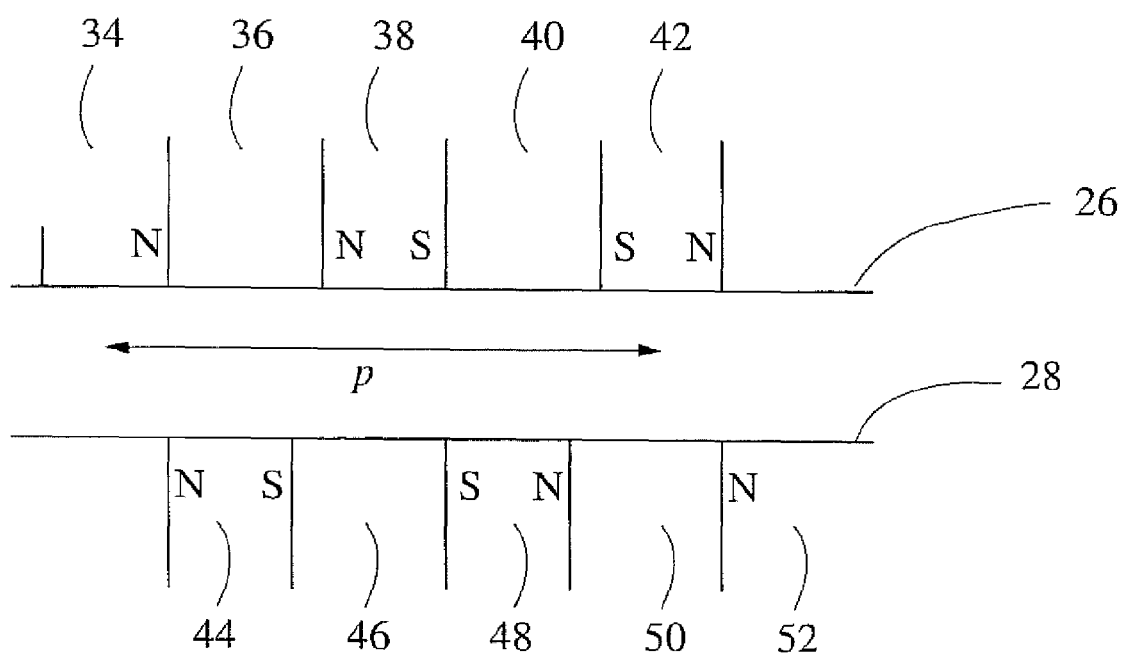
FIG. 4 shows a first arrangement of magnets on the surfaces of the first and second rotors in the machine of FIG. 1.

FIG. 4 shows a first possible arrangement of magnets on the surfaces 26, 28 of the first and second rotors. It will be apparent that the arrangements are the same, but are displaced from each other. In addition, it will be noted that the arrangements are shown here schematically as if the two surfaces are planar, rather than circular. The illustrated section of the surface 26 has a first magnet 34, made from permanent magnet material magnetized in a first direction, then a piece of iron 36, then a second magnet 38, made from permanent magnet material magnetized in a second direction opposite to the first direction, then a second piece of iron 40, then a third magnet 42, made from permanent magnet material magnetized in the first direction.

The illustrated section of the surface 28 has a first magnet 44, made from permanent magnet material magnetized in the second direction, then a piece of iron 46, then a second magnet 48, made from permanent magnet material magnetized in the first direction, then a second piece of iron 50, then a third magnet 52, made from permanent magnet material magnetized in the second direction.

In this case, the arrangement of magnets on the surfaces 26, 28 has a pitch p equal to the width of two of the magnets plus two of the pieces of iron, as shown in FIG. 4.

Figure 5:
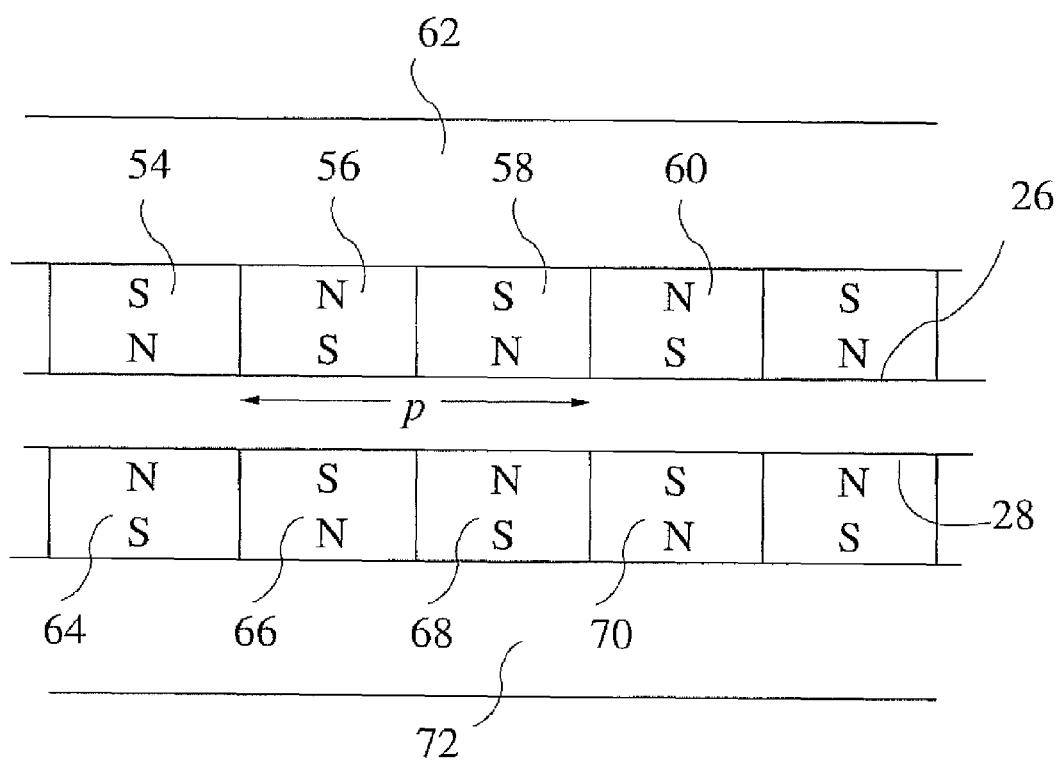
FIG. 5 shows a second alternative arrangement of magnets on the surfaces of the first and second rotors in the machine of FIG. 1.

FIG. 5 shows a second possible arrangement of magnets on the surfaces 26, 28 of the first and second rotors. Again, it will be apparent that the arrangements are the same, but are displaced from each other, and it will be noted that the arrangements are shown here schematically as if the two surfaces are planar, rather than circular.

In FIG. 5, the illustrated section of the surface 26 has a first magnet 54, made from permanent magnet material magnetized in a first direction, then a second magnet 56, made from permanent magnet material magnetized in a second direction opposite to the first direction, then a third magnet 58, made from permanent magnet material magnetized in the first direction, then a fourth magnet 60, made from permanent magnet material magnetized in the second direction, and so on. A piece of ferromagnetic material, for example iron, 62 is connected to one end of each of these magnets 54, 56, 58, 60.

The illustrated section of the surface 28 has a first magnet 64, made from permanent magnet material magnetized in the second direction, then a second magnet 66, made from permanent magnet material magnetized in the first direction, then a third magnet 68, made from permanent magnet material magnetized in the second direction, then a fourth magnet 70, made from permanent magnet material magnetized in the first direction, and so on. A piece of ferromagnetic material, for example iron, 72 is connected to one end of each of these magnets 64, 66, 68, 70.

In this case, the arrangement of magnets on the surfaces 26, 28 has a pitch p equal to the width of two of the magnets as shown in FIG. 5.

Figure 6:
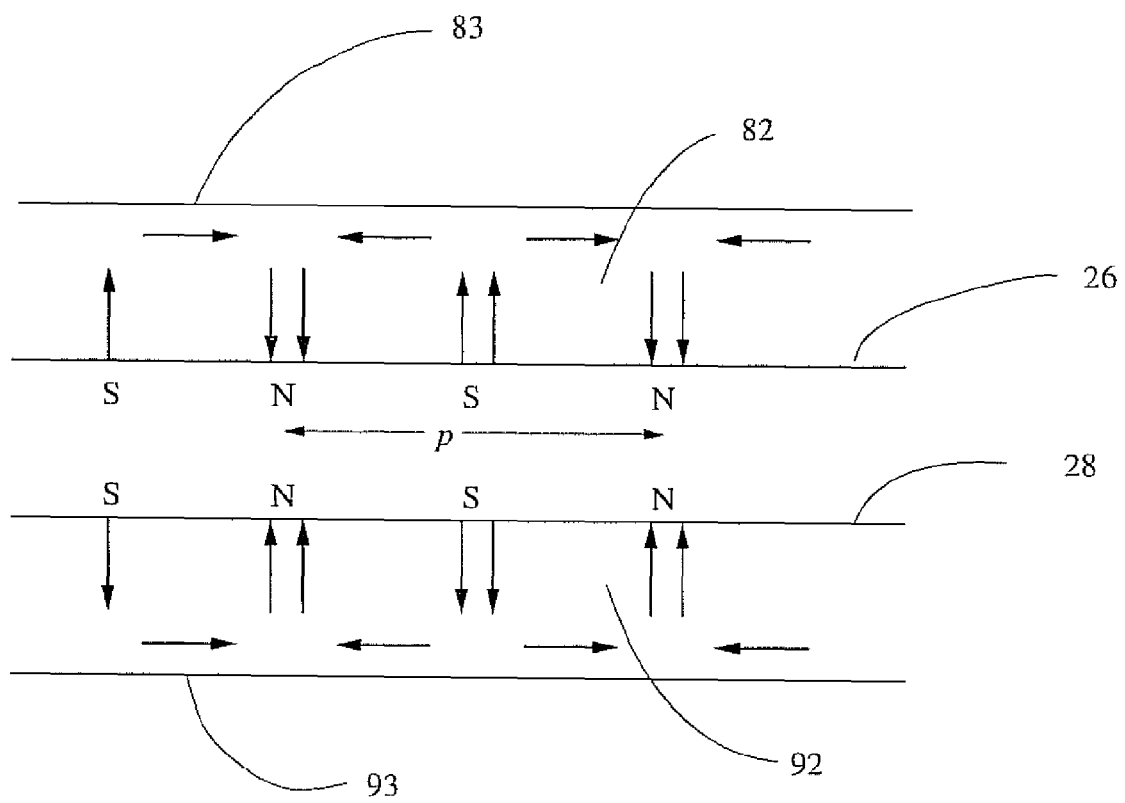
FIG. 6 shows a third alternative arrangement of magnets on the surfaces of the first and second rotors in the machine of FIG. 1.

FIG. 6 shows a third possible arrangement of magnets on the surfaces 26, 28 of the first and second rotors. Again, it will be apparent that the arrangements are the same, but are displaced from each other, and it will be noted that the arrangements are shown here schematically as if the two surfaces are planar, rather than circular.

In FIG. 6, the illustrated section of the surface 26 has permanent magnet material 82 magnetized in such a way as to produce a succession of North and South poles at the surface 26 as shown and very little magnetic field on the opposite surface 83, in an arrangement known as a Halbach array to a person skilled in the art.

The illustrated section of surface 28 has permanent magnet material 92 magnetized in such a way as to produce a succession of magnetic North and South poles at the surface 28 as shown and very little magnetic field on the surface 93, again forming a Halbach array.

Again, the arrangement of magnets on the surfaces 26, 28 has a pitch p equal to the distance between two successive North poles, or between two successive South poles, as shown in FIG. 6.

Whether the magnets are as shown in FIG. 4, or as shown in FIG. 5, or as shown in FIG. 6, they produce a degree of coupling between the first rotor 10 and the second rotor 18. It is also possible to use an arrangement of magnets which is based on a mixture of the schemes outlined in FIGS. 4, 5 and 6. For instance a machine could be designed based on the magnets at surface 28 of FIG. 6 co-operating with the magnets shown at surface 26 of FIG. 5.

It is also possible to produce the magnetic field at surfaces 26 or 28 by using conventional electrical machine windings.

Figure 7:
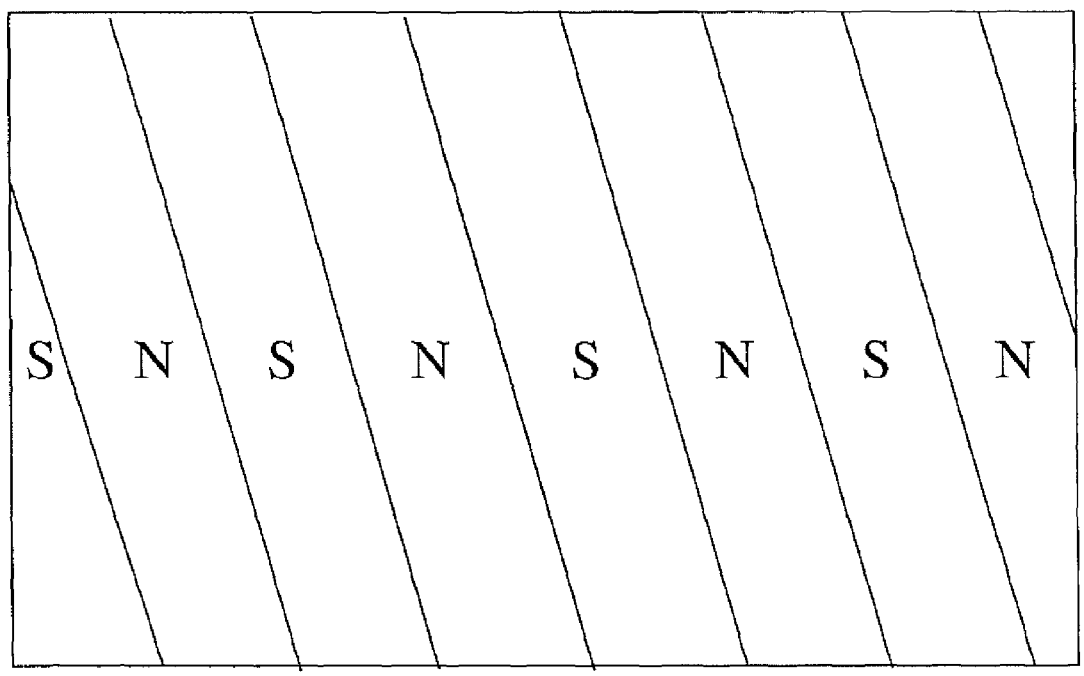
FIG. 7 shows another aspect of the arrangement of magnets on the surfaces of the first and second rotors in the machine of FIG. 1.

FIG. 7 shows in more detail the arrangements of the magnets on the surfaces 26, 28. Specifically, the magnets are arranged in helical patterns. These helical patterns have the effect that rotation of the first rotor 10 about its axis of rotation causes rotation of the second rotor 18 about its perpendicular axis of rotation. It is impossible to provide identical helices on surfaces 26 and 28 for the case of the torus and cylinder but this is not necessary.

From a stationary position, in which the arrangements of magnets have settled into positions in which the attraction between the magnets of opposite poles and the repulsion between the magnets of the same polarity is maximized, rotation of the first rotor 10 about its axis of rotation causes rotation of the second rotor 18 about its axis of rotation (since it is unable to move with the first rotor about the axis of rotation of the first rotor) in order to maintain a position in which this attraction is maximized. In addition, the fact that the second rotor has a rotational radius that is much smaller than the rotational radius of the first rotor causes a gearing effect.

If the first rotor moves a peripheral distance equal to the pitch p of the magnetic helix, for example as shown in FIG. 4, 5 or 6, the second rotor rotates a full 360 degrees. For example, if the first rotor 10 has an outside diameter of 5 m and the second rotor 18 has an outside diameter of around 0.5 m, a gear ratio of around 150:1 (that is, the second rotor rotates 150 times for each rotation of the first rotor) may be advantageous. The gear ratio can be altered by changing the diameter of the first rotor and/or of the second rotor, by changing the pitch p of the magnets, or by using more starts on the helical thread patterns.

There is thus provided an electrical machine that can convert relatively slow rotation efficiently into a faster rotation that can be used more conveniently for generating electrical power.

Although one basic structure has been illustrated, it will be appreciated that other structures are possible.

Figure 8:
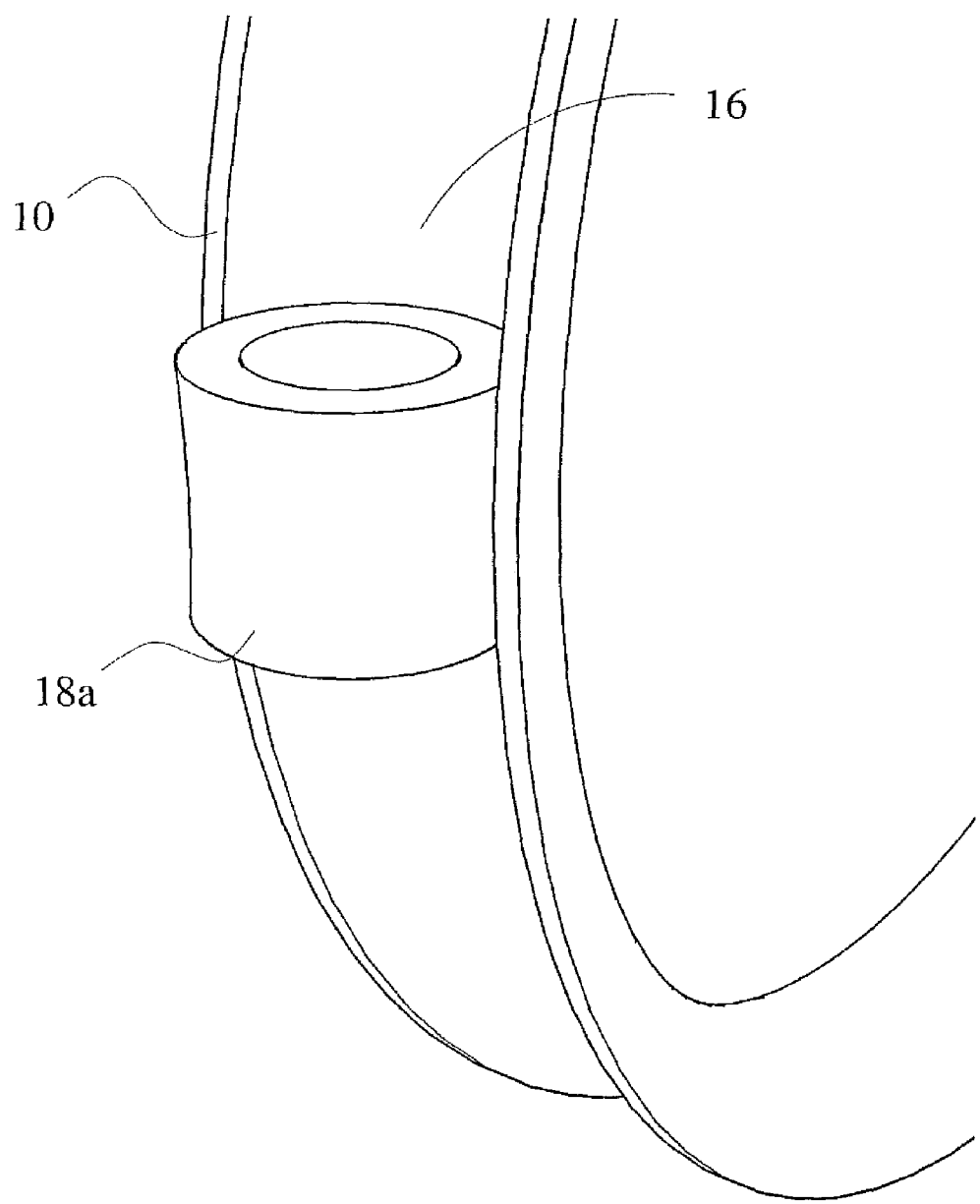
FIG. 8 shows an alternative concave section cylinder form of the second rotor.

FIG. 8 shows an alternative form of the first and second rotors. As discussed above with reference to FIG. 1, the first rotor 10 is in the form of a torus, from which the part of the circular cross section that lies furthest from the axis of rotation is omitted, leaving an annular gap 16. Stated alternatively, the first rotor 10 is in the form of a circumferentially-sliced torus, such that a cross section of the torus forms an arc and an annular gap 16 across a radially outer portion of the torus. In the embodiment shown in FIG. 8, the second rotor 18a is not in the form of a right circular cylinder, but rather is a cylindrical object formed by rotating a curved line about the axis 22. In particular, it may be advantageous to arrange for a concave surface, as illustrated in FIG. 8, as that conforms more closely to the surface of the inside of the first rotor 10.

Figure 9:
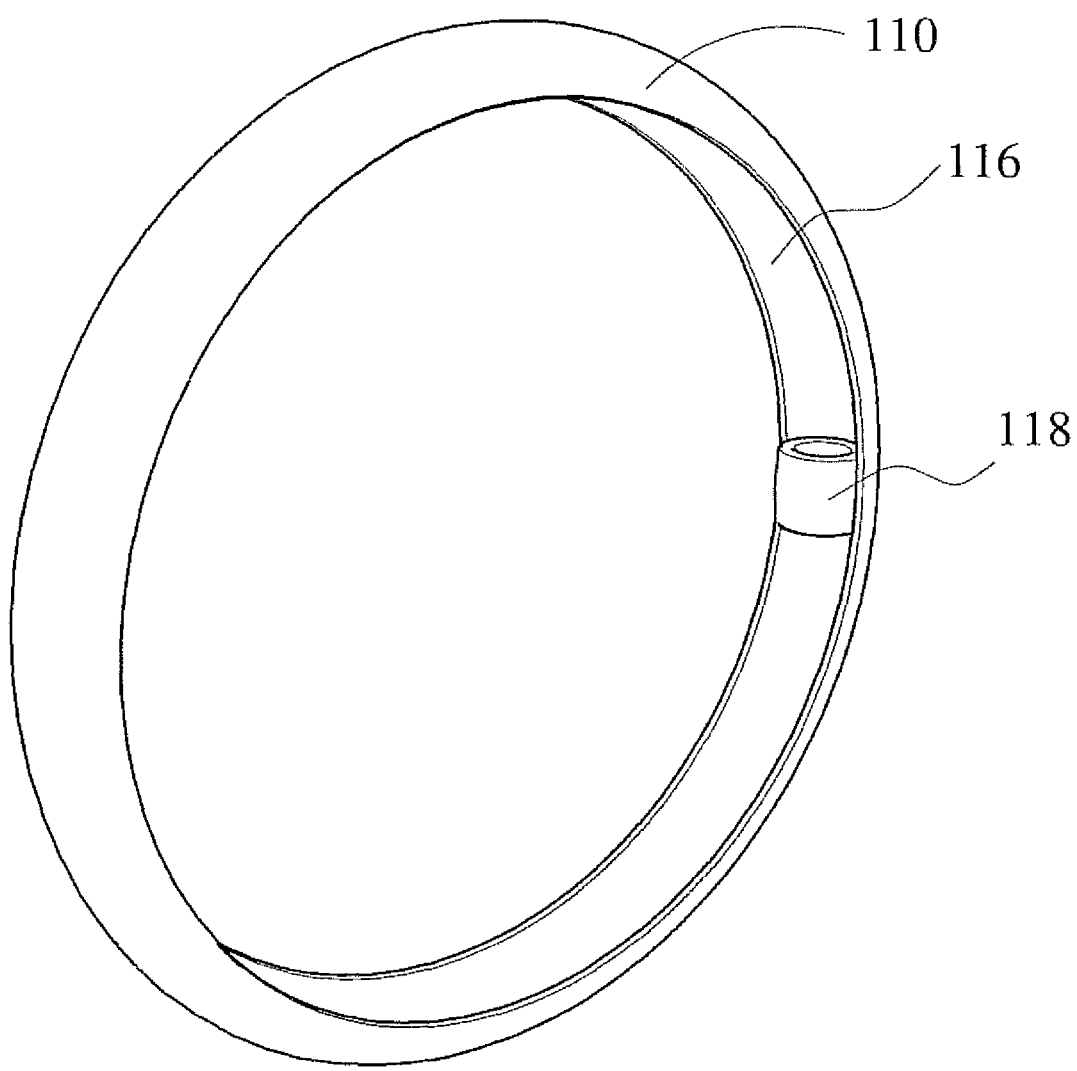
FIG. 9 shows a second alternative arrangement of the first and second rotors.
Figure 10:
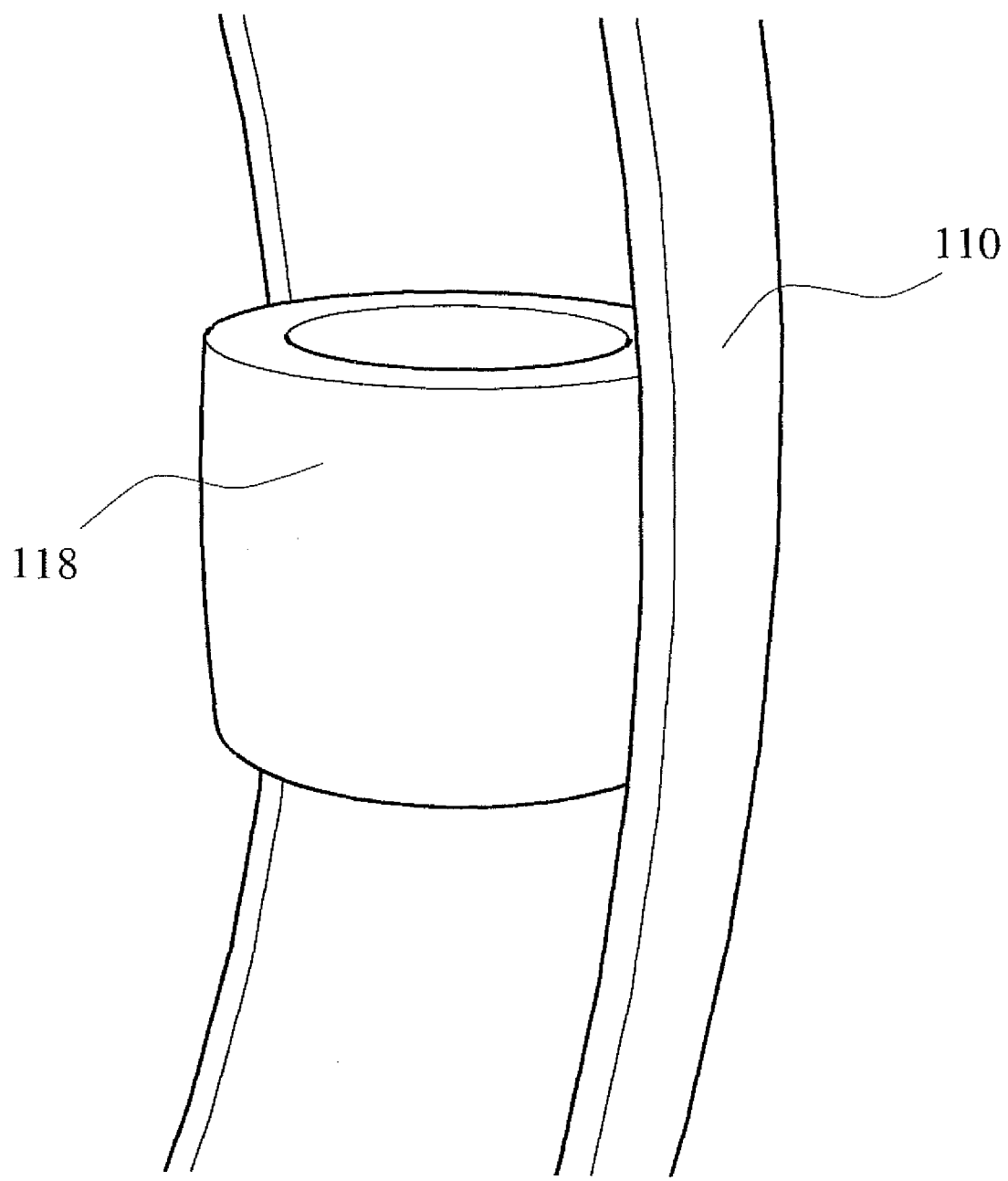
FIG. 10 shows an alternative convex section cylinder barrel form of the second rotor.

FIG. 9 shows a further alternative form of the first and second rotors, in which the first rotor 110 forms an incomplete torus in which the part of the circular cross section that lies nearest to the axis of rotation is omitted, leaving an annular gap 116, with the second rotor 118 being visible through this gap. Stated alternatively, the first 110 is in the form of a circumferentially-sliced torus, such that a cross section of the torus forms an arc and an annular gap 116 across a radially inner portion of the torus. In this case the second rotor might advantageously be formed by rotating a curved line about the axis 22 so as to form a barrel shaped body with a convex surface as illustrated in more detail in FIG. 10, as in this case that shape conforms more closely to the surface of the inside of the first rotor 10.

Figure 11:
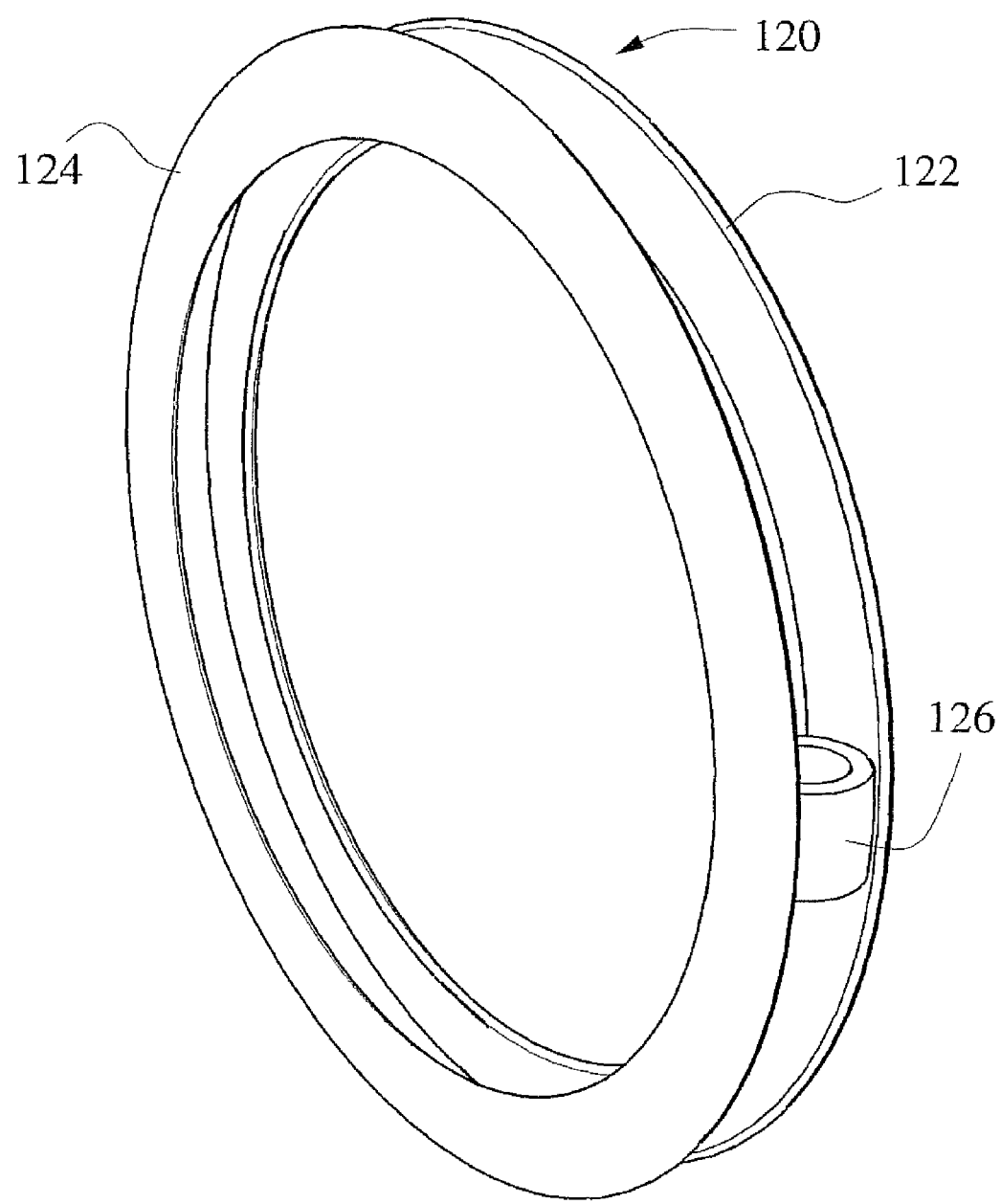
FIG. 11 shows a third alternative arrangement of the first and second rotors.

FIG. 11 shows a further alternative arrangement, in which the first rotor 120 is formed in the shape of an incomplete torus having two side pieces 122, 124, by omitting the part of the torus's circular cross section that lies nearest to the axis of rotation of the first rotor and also the part of the circular cross section that lies furthest from the axis of rotation. Stated alternatively, the first rotor 120 is in the form of a doubly-sliced torus, the torus being sliced along opposite faces of a disk centered in the torus's midplane to form the two concentric side pieces 122, 124, a first side piece 122 and a second side piece 124, positioned on first and second portions, respectively, of the torus's circular cross section. The second rotor 126 is held between the two parts 122, 124.

Figure 12:
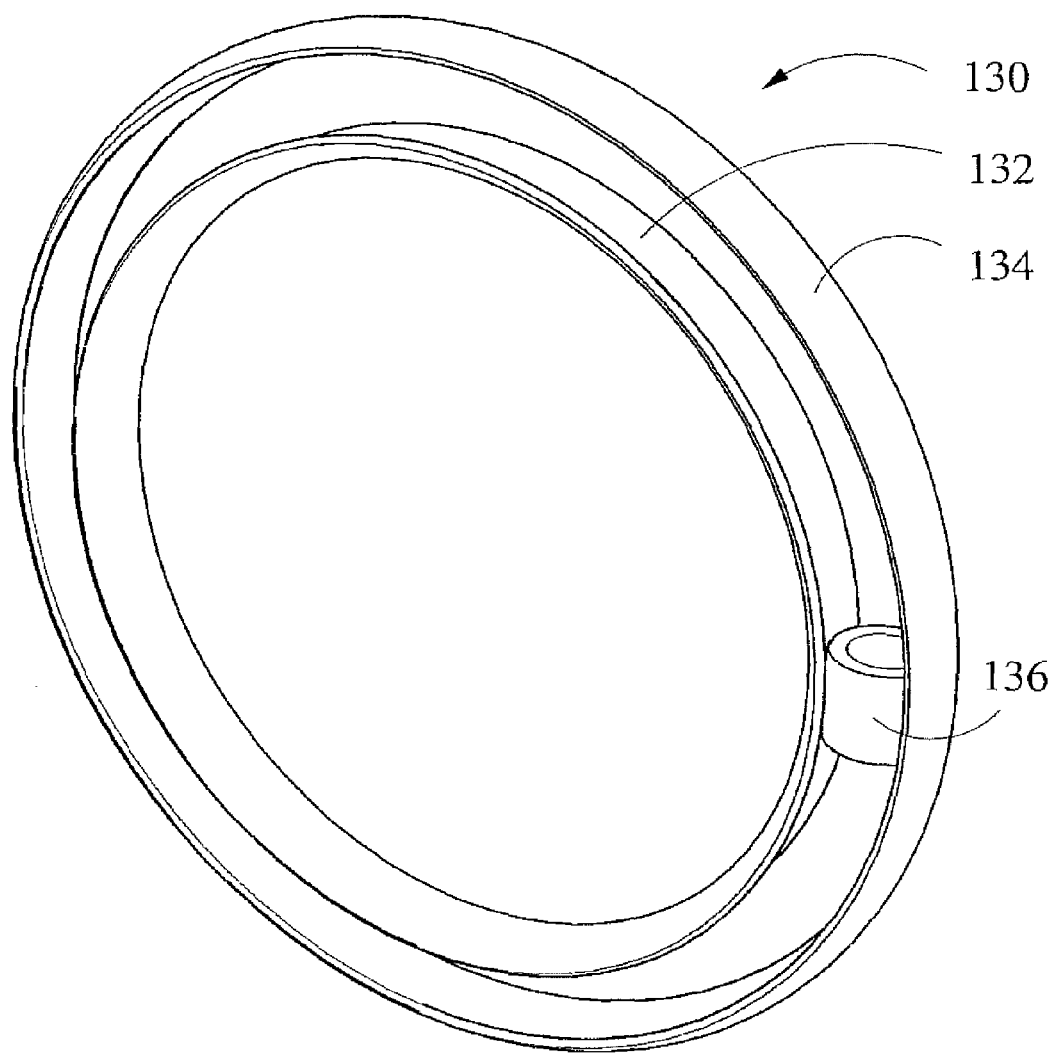
FIG. 12 shows a fourth alternative arrangement of the first and second rotors.

FIG. 12 shows a further alternative arrangement, in which the first rotor 130 is formed in the shape of an incomplete torus having two parts 132, 134, by retaining only the part 132 of the circular cross section that lies nearest to the axis of rotation and the part 134 of the circular cross section that lies furthest from the axis of rotation, while omitting two annular side pieces. Stated alternatively, the first rotor 130 is in the form of a doubly-sliced torus, the torus being sliced along opposite sides of a rectangular shape centered in the torus's circular cross section and perpendicular to the midplane of the torus, thereby forming annular gaps between radially inner and outer surfaces thereof. The second rotor 136 is held between the two parts 132, 134.

In order to illustrate the advantages of the invention, an outline design of a 6.5 MW wind turbine generator is provided, based on the arrangement of first and second rotors 110, 118 as shown in FIG. 9. In this example, the first rotor 110 has an outside diameter of 5 m, and a rotational speed of 16 rpm (revolutions per minute). There are sixteen second rotors 118, each having an outside diameter of 0.5 m and a length of 0.4 m, and having a rotational speed of 2800 rpm. The active parts of this device have a total mass of 9 T (tonnes). This can be compared with the estimated total mass of the active parts of a conventional direct drive permanent magnet 6.5 MW wind turbine rotating at 16 rpm, which is around 42 T. It also compares favourably with that of an existing experimental 5 MW wind turbine (built by Repower), which has an asynchronous doubly fed generator, operating at a speed of 670-1170 rpm driven by a mechanical gearbox, in which the gearbox has a mass of 63 T and the generator has a mass of 17 T.

In most rotating or linear electrical machines, it is important to maintain a small mechanical clearance between moving parts. If this is to be done in the case of a large electrical machine, it often means that the mass of supporting structure, used to impart rigidity, but not electromagnetically active, is increased. The mass problem can be alleviated in the case of the present invention by allowing the structure to be relatively light and flexible, while maintaining the necessary clearances by using wheels to support the second rotors, running on tracks which are attached to the first rotor.

Figure 13:
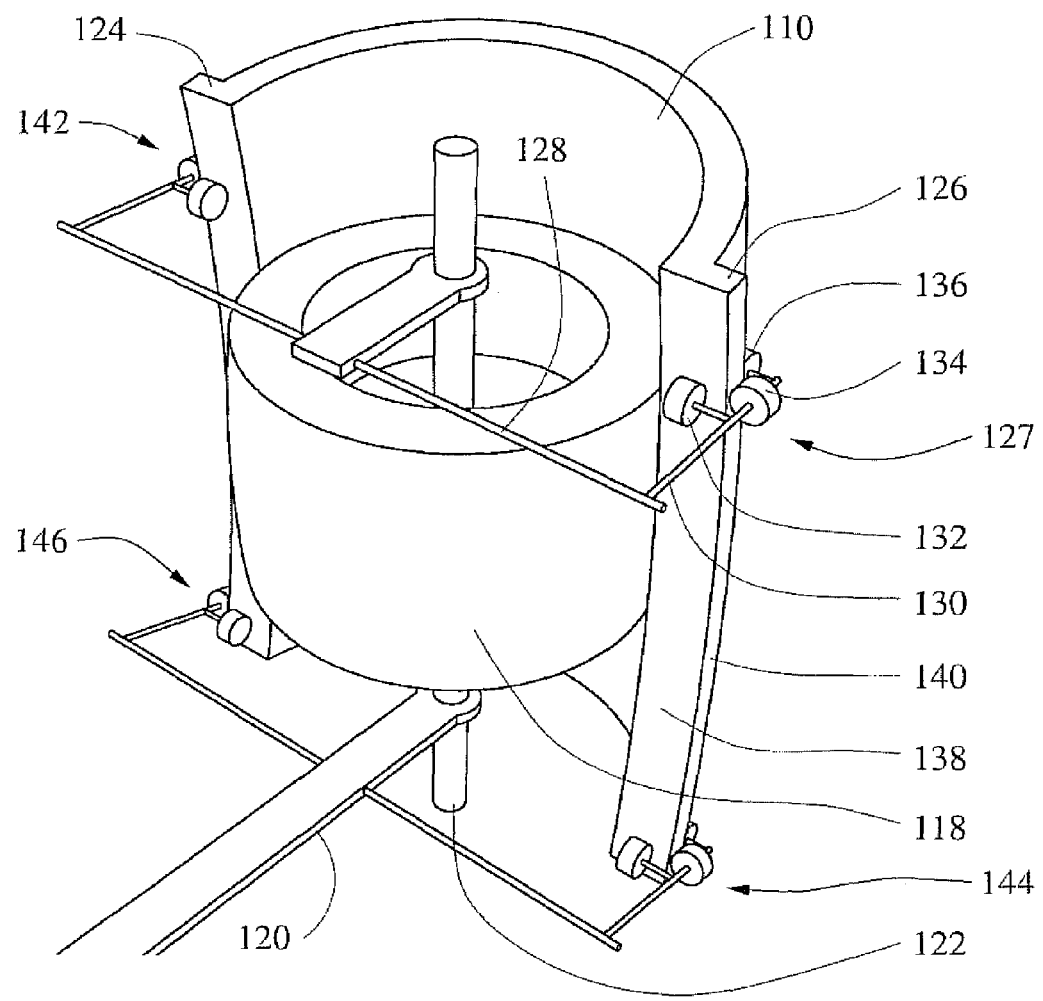
FIG. 13 illustrates a further machine in accordance with the invention, having a wheeled support for the second rotors.

FIG. 13 shows a machine of this type. The first and second rotors 110, 118 are of the type shown in FIG. 10, in which the first rotor 110 forms an incomplete torus in which the part of the circular cross section that lies nearest to the axis of rotation is omitted, and the second rotor 118 is barrel-shaped. The second rotor 118 is mounted on a support structure 120, which allows it to rotate about an axis 122.

The required clearance between the first and second rotors 110, 118 is maintained by a structure in which rails 124, 126 are provided on the outer surface of the first rotor 110. In this case, the rails 124, 126 each have a rectangular profile.

Connected to the axle 122 above the second rotor 118 is a mechanism 127 comprising a first rod 128, which is at 90° to the axle 122, and is connected to a second rod 130 at an angle of about 90°. Connected to this second rod 130 are three wheels 132, 134, 136. The first wheel 132 is located so that it can run along a surface 138 of the rail 126 that is perpendicular to the outer surface of the first rotor 110. The second wheel 134 is located so that it can run along a surface 140 of the rail 126 that is parallel to the outer surface of the first rotor 110. The third wheel 136 is located so that it can run along a surface (not visible in FIG. 13) of the rail 126 that is perpendicular to the outer surface of the first rotor 110 and opposite the surface 138. A similar mechanism 142 is connected between the axle 122 above the second rotor 118 and the rail 124. Further similar mechanisms 144, 146 are connected between the axle 122 below the rotor 118 and the rails 126, 124 respectively.

The invention has been described so far with reference to a machine in which the initial motion is rotational. However, a similar structure is possible where the initial motion provided by the primary energy source is linear, rather than rotational. For example, some sources of renewable energy give rise to a reciprocating linear motion, such as that found in many wave energy converters. If the first rotor shown in FIG. 1 above is replaced by a straight tube, which is driven by this reciprocating linear motion, then this movement can be converted into rotation, and hence used to generate electrical power.

Figure 14:
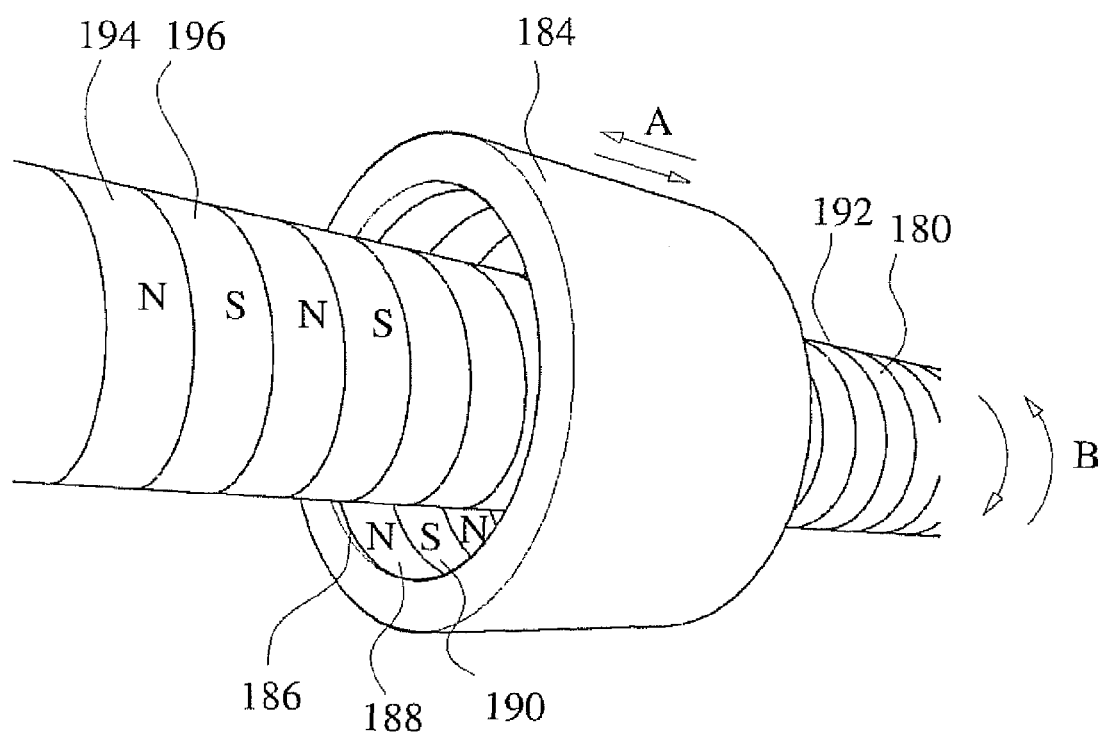
FIG. 14 shows a first arrangement of a linear generator in accordance with the present invention.

A machine, suitable for use as a generator in this situation, is shown in FIG. 14. A first tube 184 is connected to a primary source of energy, such that it is driven along its axis in a reciprocating linear motion, as shown by the arrows A. Provided on the inner surface 186 of the tube 184 is a helical arrangement of magnets 188, 190. The tube 184 is mounted around a second smaller cylinder 180. Provided on the outer surface 192 of the tube 180 is a helical arrangement of magnets 194, 196.

As a result of the interaction between the two helical arrangements of magnets, similar to that described above, the reciprocating linear motion of the tube 184 is converted into reciprocating rotation in the smaller cylinder 180 as shown by the arrows B.

A rotor (not shown, but well understood by the person skilled in the art) can than be mounted on the cylinder 180 so as to cooperate with a stationary stator to generate electrical power.

Figure 15:
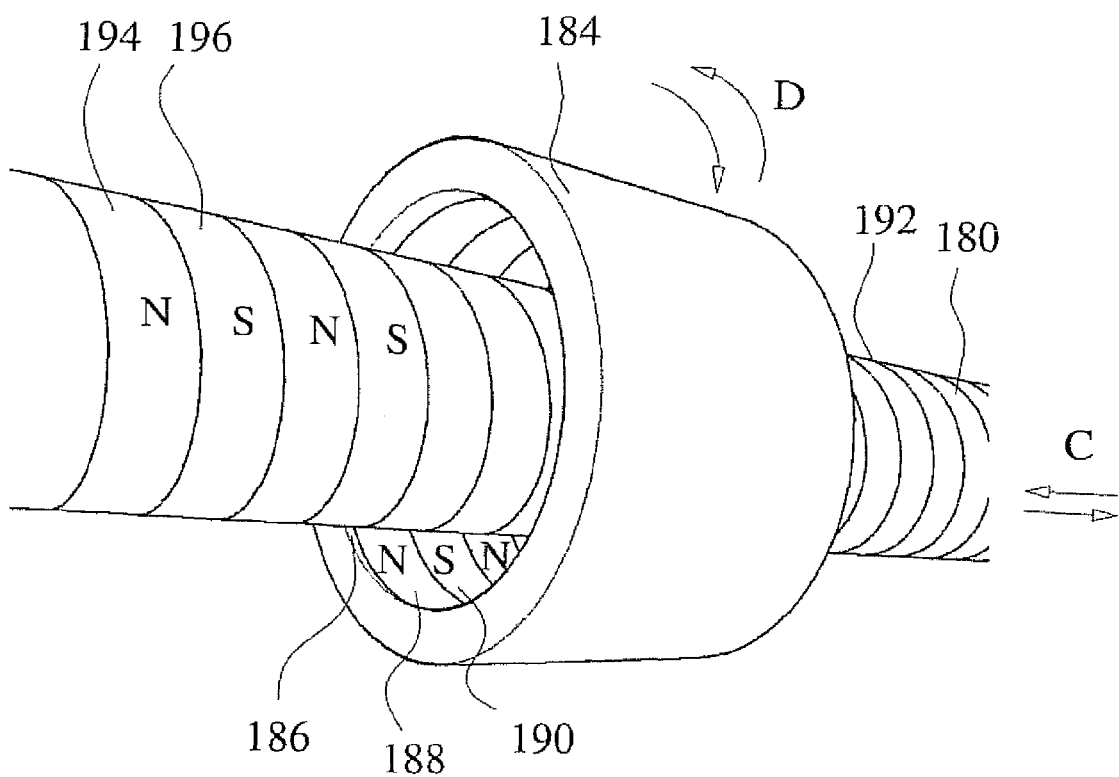
FIG. 15 shows a second arrangement of a linear generator.

FIG. 15 shows an alternative arrangement, which is identical to that shown in FIG. 14, except that the cylinder 180 is driven along its axis in a reciprocating linear motion by a primary source of energy, as shown by the arrows C, and this movement is converted into reciprocating rotation in the tube 184, as shown by the arrows D. A rotor (not shown in FIG. 15) can be mounted on the tube 184 so as to cooperate with a stationary stator to generate electrical power.

Figure 16:
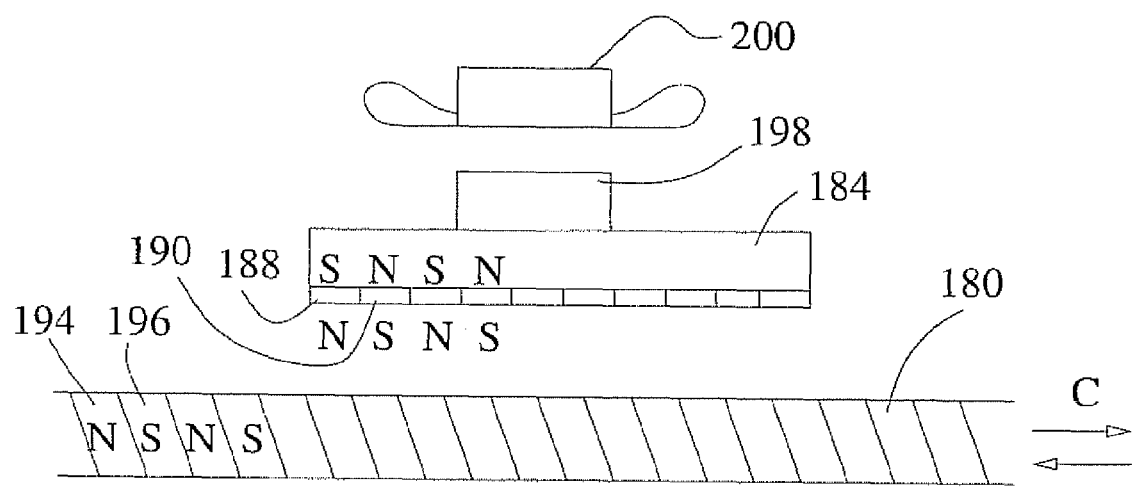
FIG. 16 shows a cross section of a linear generator.
Figure 16:
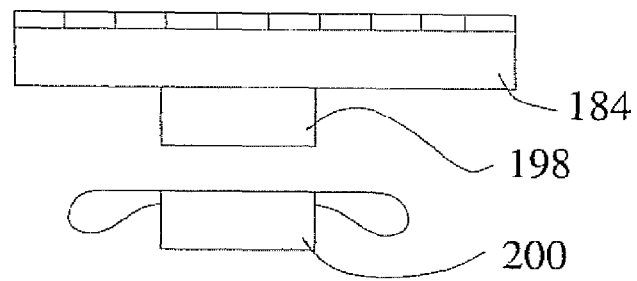

FIG. 16 is a cross section through the machine of FIG. 15, also showing the arrangement for generating electrical power. Specifically, a rotor part 198 of a generator is mounted on the outside of the tube 184, and this is located within the stator part 200 of the generator. Thus, as the cylinder 180 reciprocates as shown by the arrows C, the cylinder 184 will rotate, with changes in the rotational direction, and electrical power can be generated.

All of the embodiments so far have referred to electrical machines in the form of generators, where movement is converted to output electrical power. The same structures, with appropriate changes to the electrical connections as will be apparent to the person skilled in the art, can also be used as electric motors. Thus, for example, in the case of the structure shown in FIGS. 15 and 16, a linear motor may also be realised, if electrical power is provided to the stator 200, causing the rotor 198 to rotate, and hence causing the cylinder 180 to move along its axis.

As described above, the embodiments shown in FIGS. 14 and 15 are intended for use in situations where the primary energy source is a reciprocating motion, and will usually produce a reciprocating motion on the output side. If continuous rotation in one direction of the rotor 198 is required, however, this is also possible.

Figure 17:
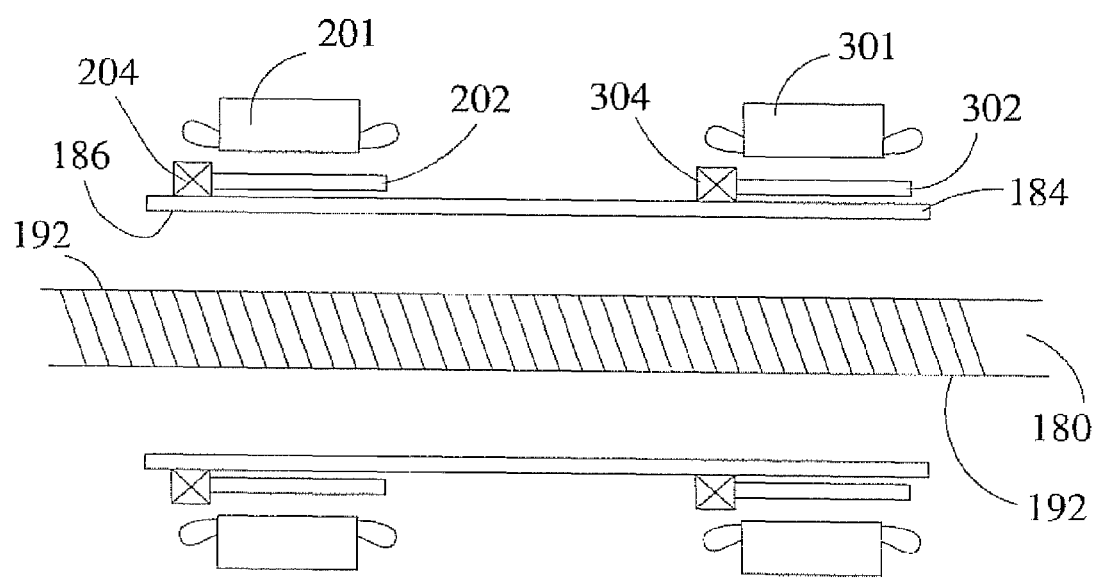
FIG. 17 shows a cross section of an alternative linear generator.

FIG. 17 shows a modification of the arrangement shown in FIG. 16, which is arranged to produce a more continuous output power.

In this arrangement, as before, a first tube 184 is mounted around a second smaller cylinder 180. Provided on the inner surface 186 of the tube 184, and on the outer surface 192 of the tube 180, are helical arrangements of magnets (not shown in FIG. 17).

In this case, there are two rotors 202, 302 mounted on the outside of the tube 184, but they are not directly driven by the tube 184. Rather, two sprag clutches 204, 304 are connected to the tube 184, and drive the rotors 202, 302. The two rotors 202, 302 then co-operate with stators 201, 301 respectively, to produce electrical power as described above. The sprag clutches (or any other similar device, which could be mechanical, hydraulic, electromechanical and so on) have the property that they produce a positive drive to a load in one direction, but will allow the load to overrun if the rotational speed of the load is greater than the input rotational speed. These clutch arrangements will be well known to the person skilled in the art, and will not be described further herein.

When the machine is being driven by a reciprocating motion of the cylinder 180, the magnetic gearing between the cylinder 180 and tube 184 will cause the tube 184 to rotate, alternating between opposite first and second rotational directions as the cylinder 180 reciprocates.

While the tube 184 is rotating in the first direction, it can drive the rotor 202 through the sprag clutch 204, which allows drive in the first direction and allows the rotor 202 to overrun in the second direction. While the tube 184 is rotating in the second direction, it can drive the rotor 302 through the sprag clutch 304, which allows drive in the second direction and allows the rotor 302 to overrun in the first direction.

In this way, the rotors 202 and 302 can act as flywheels to store energy while the cylinder 180 is stationary, so being able to deliver more constant electrical power.

Also, the stators 201, 301 can be arranged so that the electrical output is in a convenient form.

The machine shown in FIG. 17 may be modified for the case in which the reciprocating energy source consists of a power stroke in a first direction and a weaker return stroke in a second direction opposite to the first direction. This situation could occur for instance where a buoy floating in the sea pulls a chain attached to the tube 180 providing the power stroke and a spring provides the return stroke. In the machine of FIG. 17, the stator 301, rotor 302 and sprag clutch 304 could be omitted. The sprag clutch 204 then drives the rotor 202 round on the power stroke and allows the rotor 202 to overrun on the return stroke.

Figure 18:
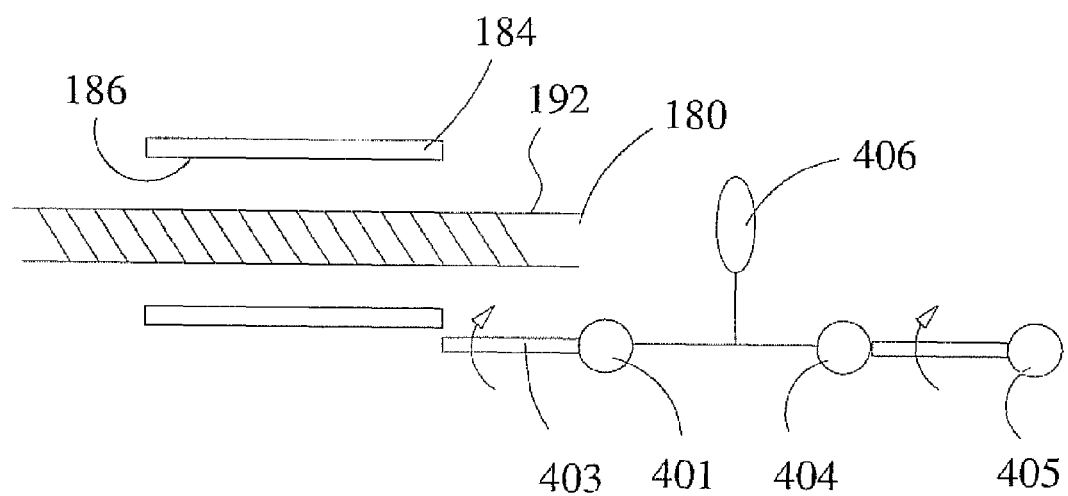
FIG. 18 shows a wave energy converter incorporating a generator in accordance with the present invention.

FIG. 18 shows a further modification of the machine, allowing the smoothing of the output power, even in circumstances where the input energy, in the form of the reciprocating motion, is not constant. For example, if a machine in accordance with the invention were to be used as part of a sea wave energy converter, it would be preferable if the electrical output from the device were reasonably smooth, despite the fact that typically the pattern of sea waves is not regular. In the embodiment of the invention shown in FIG. 18, means are provided to store energy in the converter in order to smooth out variations in input power.

As before, a first tube 184 is mounted around a second smaller cylinder 180. Provided on the inner surface 186 of the tube 184, and on the outer surface 192 of the tube 180, are helical arrangements of magnets (not shown in FIG. 17).

The arrangement is described here with reference to a situation in which reciprocating linear motion of the cylinder 180 is converted to rotation of the tube 184, as described above with reference to FIG. 15, although it will be appreciated that similar arrangements can be provided in the other embodiments of the invention described above.

The rotating tube 184 can be mechanically coupled, for example via a shaft or mechanism 403 to a hydraulic pump 401. The hydraulic pump 401 then drives a hydraulic motor 404 which will in turn drive an electrical generator 405. In this case, the fluid flow path between the hydraulic pump 401 and the hydraulic motor 404 is provided with at least one hydraulic accumulator 406. Energy storage is thus provided by the hydraulic accumulator 406 so that, even though the varying supply of energy to the cylinder 180 means that the tube 184 will not be rotating at a constant speed, the fluctuations will be smoothed by the effect of the hydraulic accumulator, so that the output of the electrical generator will be more nearly constant.

As mentioned above, similar arrangements can be provided in the cases of the embodiments of the invention. For example, the tube 184 can be held against rotation, and the cylinder 180 can thus be caused to rotate. In this case, the smoothing effect can be achieved by coupling the pump 401 to the cylinder 180.

There are thus described various electrical machines, in the form of generators and electric motors, in which an input motion of a first component is converted to an output motion of a second component, with the first and second components being coupled together by means of a magnetic gearing.

Although the magnetic gearing is thus described in the context of electrical machines, the same magnetic gearing mechanisms can be used in other situations, for example where the gearing mechanism is used to change the speed of some other type of machine. For example, in the arrangement shown in FIG. 1, the second rotors could incorporate hydraulic motors or pumps or compressors, and may not have any electrical context.

The invention claimed is:

1. An electrical machine, comprising:
   a generator, configured to generate electrical power, the generator comprising:
   a first rotor, rotatable about a first axis, and having a first arrangement of magnets on a first surface thereof;
   a second rotor in the form of a hollow cylinder, held with a first surface thereof adjacent the first surface of the first rotor and such that it cannot rotate about the first axis, but is rotatable about a second axis, and having a second arrangement of magnets on the first surface thereof; and
   a stator located within the hollow cylinder with coils of wire configured to generate electrical power;
   wherein the first and second arrangements of magnets are such that rotation of the first rotor about the first axis causes rotation of the second rotor about the second axis.

2. The electrical machine of claim 1, wherein:
   the first rotor is in the form of an at least partial hollow torus, with the first surface thereof being an internal surface;
   the second rotor is located within the hollow torus, with the first surface thereof being an external surface, such that the second axis is perpendicular to the first axis.

3. The electrical machine of claim 2, wherein the first rotor is in the form of the at least partial hollow torus extending fully around the first axis, but extending only partially around the second axis.

4. An electrical machine, comprising:
   a generator, configured to generate electrical power, the generator comprising:
   a first rotor, rotatable about a first axis, and having a first arrangement of magnets on a first surface thereof;
   a second rotor, held with a first surface thereof adjacent the first surface of the first rotor and such that it cannot rotate about the first axis, but is rotatable about a second axis, and having a second arrangement of magnets on the first surface thereof; and
   a stator located within the second rotor with coils of wire configured to generate electrical power;
   wherein the first and second arrangements of magnets are such that rotation of the first rotor about the first axis causes rotation of the second rotor about the second axis.
   wherein the first rotor is in the form of a circumferentially-sliced torus, such that a cross section of the torus forms an arc and an annular gap across a radially outer portion of the torus.

5. An electrical machine, comprising:
   a generator, configured to generate electrical power, the generator comprising:
   a first rotor, rotatable about a first axis, and having a first arrangement of magnets on a first surface thereof;
   a second rotor, held with a first surface thereof adjacent the first surface of the first rotor and such that it cannot rotate about the first axis, but is rotatable about a second axis, and having a second arrangement of magnets on the first surface thereof; and
   a stator located within the second rotor with coils of wire configured to generate electrical power;
   wherein the first and second arrangements of magnets are such that rotation of the first rotor about the first axis causes rotation of the second rotor about the second axis,
   wherein the first rotor is in the form of a circumferentially-sliced torus, such that a cross section of the torus forms an arc and an annular gap across a radially inner portion of the torus.

6. An electrical machine, comprising:
   a generator, configured to generate electrical power, the generator comprising:
   a first rotor, rotatable about a first axis, and having a first arrangement of magnets on a first surface thereof;
   a second rotor, held with a first surface thereof adjacent the first surface of the first rotor and such that it cannot rotate about the first axis, but is rotatable about a second axis, and having a second arrangement of magnets on the first surface thereof;
   wherein the first and second arrangements of magnets are such that rotation of the first rotor about the first axis causes rotation of the second rotor about the second axis,
   wherein the first rotor is in the form of a doubly-sliced torus, the torus being sliced to form only two pieces concentric with the first axis, where the two pieces are positioned at two different axial locations forming an annular gap between the two pieces in an axial direction with respect to the first axis.

7. An electrical machine, comprising:
   a generator, configured to generate electrical power, the generator comprising:
   a first rotor, rotatable about a first axis, and having a first arrangement of magnets on a first surface thereof;
   a second rotor, held with a first surface thereof adjacent the first surface of the first rotor and such that it cannot rotate about the first axis, but is rotatable about a second axis, and having a second arrangement of magnets on the first surface thereof;
   wherein the first and second arrangements of magnets are such that rotation of the first rotor about the first axis causes rotation of the second rotor about the second axis,
   wherein the first rotor is in the form of a doubly-sliced torus, the torus being sliced to form only two pieces concentric with the first axis, where the two pieces are positioned at two different radial locations forming an annular gap between the two pieces in a radial direction with respect to the first axis.

8. The electrical machine as claimed in any one of claims 2 to 7, comprising a plurality of said second rotors, held spaced apart within the hollow torus at predetermined positions around the first axis.

9. The electrical machine of claim 1, wherein:
   the first arrangement of magnets on the first surface of the first rotor comprises a helical arrangement;
   and the second arrangement of magnets on the first surface of the second rotor comprises a corresponding helical arrangement.

10. The electrical machine of claim 1, in the form of a wherein the second rotor and the stator are positioned relative to each other such that rotation of the second rotor about the second axis causes an electrical current to be generated.

11. An electrical machine, comprising:
    a generator, configured to generate electrical power, the generator comprising:

a first rotor, rotatable about a first axis, and having a first arrangement of magnets on a first surface thereof;

a second rotor in the form of a hollow cylinder, held with a first surface thereof adjacent the first surface of the first rotor and such that it cannot rotate about the first axis, but is rotatable about a second axis, and having a second arrangement of magnets on the first surface thereof; and a stator located within the hollow cylinder with coils of wire configured to generate electric power;

wherein the first and second arrangements of magnets are such that rotation of the first rotor about the first axis causes rotation of the second rotor about the second axis; and wherein the first and second arrangements of magnets each comprise repeated sequences of:

a first magnet formed from permanent magnet material magnetized in a first direction parallel to the respective first surface;

a first piece of ferromagnetic material;

a second magnet formed from permanent magnet material magnetized in a second direction parallel to the respective first surface and opposite to the first direction; and a second piece of ferromagnetic material.

* * * * *